United States Patent
Anemikos et al.

(10) Patent No.: US 7,810,054 B2
(45) Date of Patent: Oct. 5, 2010

(54) METHOD OF OPTIMIZING POWER USAGE OF AN INTEGRATED CIRCUIT DESIGN BY TUNING SELECTIVE VOLTAGE BINNING CUT POINT

(75) Inventors: Theodoros E. Anemikos, Milton, VT (US); Jeanne Bickford, Essex Junction, VT (US); Laura S. Chadwick, Essex Junction, VT (US); Susan K. Lichtensteiger, Essex Junction, VT (US); Anthony D. Polson, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/041,729

(22) Filed: Mar. 4, 2008

(65) Prior Publication Data

US 2009/0228843 A1 Sep. 10, 2009

(51) Int. Cl.
*G06F 17/50* (2006.01)
(52) U.S. Cl. .............................................. 716/2; 716/1
(58) Field of Classification Search .................... 716/1, 716/2, 4, 7
See application file for complete search history.

(56) References Cited

U.S. PATENT DOCUMENTS

| 5,774,367 | A * | 6/1998 | Reyes et al. ..................... 716/2 |
| 7,139,630 | B1 * | 11/2006 | Clougherty et al. ......... 700/108 |
| 7,475,366 | B2 * | 1/2009 | Kuemerle et al. ............... 716/1 |
| 2006/0246610 | A1 * | 11/2006 | Clougherty et al. ........... 438/14 |
| 2007/0129835 | A1 * | 6/2007 | Clougherty et al. ......... 700/108 |
| 2008/0034337 | A1 | 2/2008 | Kuemerle et al. |

* cited by examiner

*Primary Examiner*—Sun J Lin
(74) *Attorney, Agent, or Firm*—Gibb I.P. Law Firm, LLC

(57) ABSTRACT

A method of optimizing power usage in an integrated circuit design analyzes multiple operating speed cut points that are expected to be produced by the integrated circuit design. The operating speed cut points are used to divide identically designed integrated circuit devices after manufacture into relatively slow integrated circuit devices and relatively fast integrated circuit devices. The method selects an initial operating speed cut point to minimize a maximum power consumption level of the relatively slow integrated circuit devices and the relatively fast identically designed integrated circuit devices. The method then manufactures the integrated circuit devices using the integrated circuit design and tests operating speeds and power consumption levels of the identically designed integrated circuit devices. Then, the method adjusts the initial operating speed cut point to a final operating speed cut point based on the testing, to minimize the maximum power consumption level of the relatively slow integrated circuit devices and the relatively fast integrated circuit devices.

6 Claims, 3 Drawing Sheets

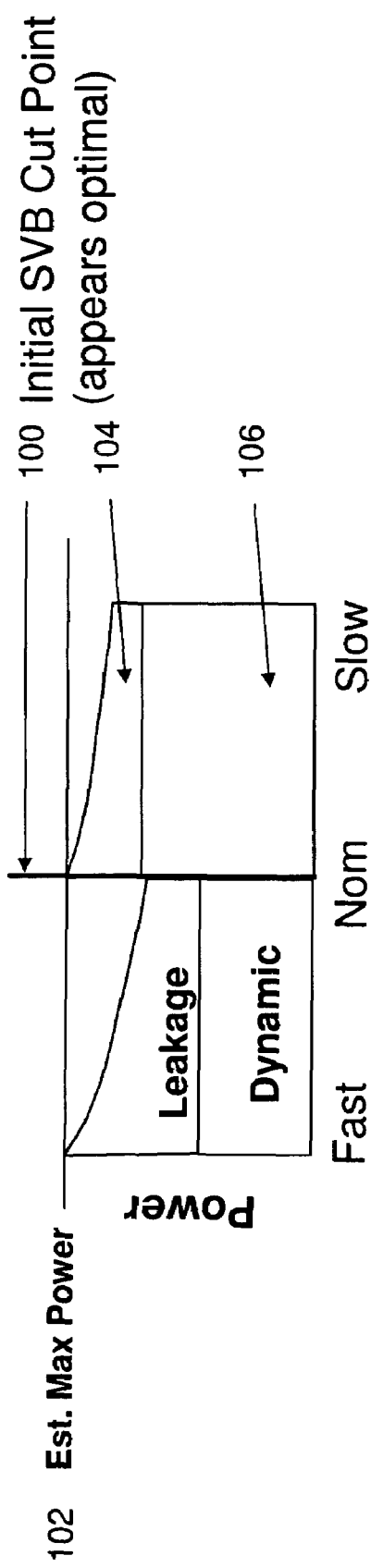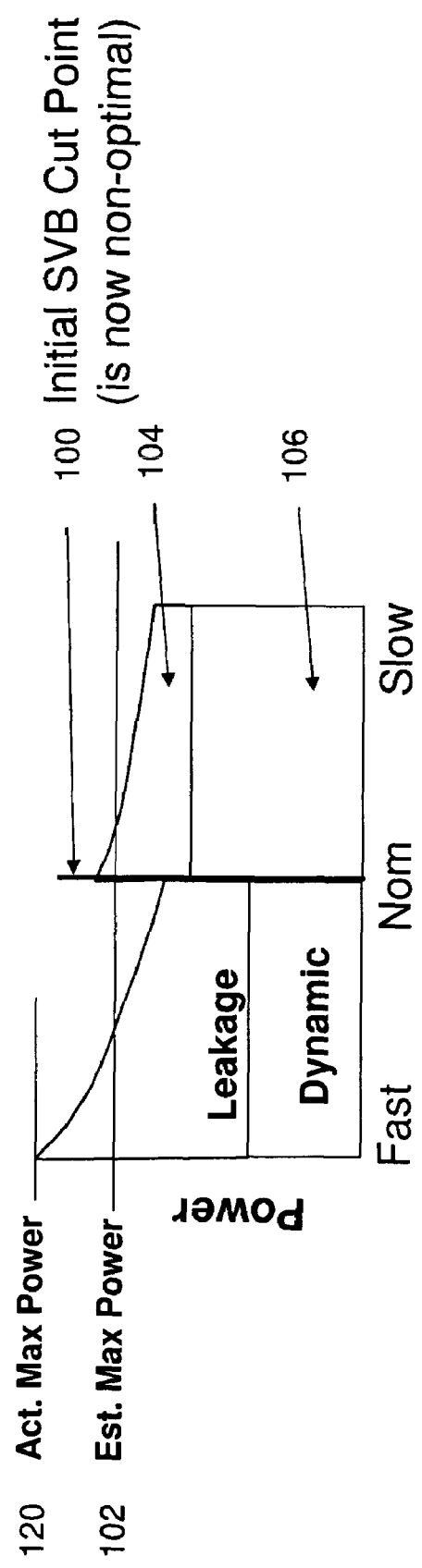

METHOD OF OPTIMIZING POWER USAGE OF AN INTEGRATED CIRCUIT DESIGN BY TUNING SELECTIVE VOLTAGE BINNING CUT POINT

BACKGROUND

1. Field of the Invention

The embodiments of the invention generally relate to optimizing power usage in integrated circuit designs and more particularly to a method that moves the cut point after manufacture.

2. Description of Related Art

U.S. Patent Publication 2008/0034337 (the complete disclosure of which is incorporated herein by reference) discloses that manufacturing variations may cause one or more parameters to vary between integrated circuits that are formed according to the same design. These variations can affect chip operating frequency (i.e., switching speed). For example, due to variations in the equipment, operators, position on a wafer, etc., a specific parameter may vary between chips built on the same wafer, chips built on different wafers in the same lot and/or on chips built on different wafers in different lots. If this parameter is, for example, line width, then the channel width of the transistors on each chip may be different such that the performance varies (e.g., faster or slower). Chips that are fabricated either at the "slow" end or the "fast" end of a process distribution (e.g., a process-temperature-variation (PVT) space) may not be desirable. For example, chips that are fabricated at the "slow" end of such a process distribution may not meet the desired performance specification (i.e., may not have a fast enough switching speed), whereas chips fabricated at the "fast" end of this process distribution may exhibit excessive power and leakage current. Thus, conventional teachings describe a process to run faster parts at lower voltage and slower parts at higher voltage, in order to reduce the maximum power for the distribution of parts. The division between the fast and slow portions of the distribution (i.e. the cutpoint), is generally determined apriori during the design phase.

SUMMARY

Embodiments herein provide a method of optimizing power usage in an integrated circuit design. The process first analyzes multiple operating speed cut points that are expected to be produced by the integrated circuit design. When the integrated circuit design is used to produce many integrated circuit devices (e.g., parts, chips, etc.) these integrated circuit devices will be "identically designed" integrated circuit devices because they were all manufactured according to the same integrated circuit design. However, even these identically designed integrated circuit devices will perform at different operating speeds because of manufacturing process variations.

The operating speed "cut points" are used to divide these identically designed integrated circuit devices into different bins after manufacture. This "binning" process will produce a bin of relatively slow integrated circuits and a bin of relatively fast integrated circuit devices, with the operating speed cut point determining into which bin the manufactured integrated circuit devices will be sorted.

The relatively fast integrated circuit devices consume more power than the relatively slow integrated circuit devices. The relatively fast integrated circuit devices will be operated at a lower voltage to keep their operating speed and power consumption approximately equal to the relatively slow integrated circuit device. Therefore, the method selects an initial operating speed cut point that will minimize the maximum power level of the relatively slow integrated circuits and relatively fast integrated circuit devices. The initial operating speed cut point is selected to cause the fastest of the relatively slow integrated circuits to consume the same amount of power as the fastest of the relatively fast integrated circuit devices (which is operating at a relatively lower voltage).

After the initial operating speed cut point is established (based on the design and the presumptions about what manufacturing variations will occur), the integrated circuit devices are actually manufactured, all by using the same integrated circuit design. The operating speeds and power consumption levels of the integrated circuit devices are then tested. The test results can be embedded into some form of memory of the integrated circuit devices.

However, rather than just sorting the integrated circuit devices using the initial operating speed cut point, the method adjusts the initial cut point to a final cut point based on the data from the testing to again minimize the maximum power level of the relatively slow integrated circuits and relatively fast integrated circuit devices. The final operating speed cut point is similarly selected to cause the relatively slow integrated circuits and relatively fast integrated circuit devices to consume the same maximum power. However, the final operating speed cut point is based on actual test results instead of theoretical presumptions and has a higher level of accuracy.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIGS. 1A-1C are diagrams showing various cut points according to embodiments herein.

DETAILED DESCRIPTION OF EMBODIMENTS

Figure 1C:
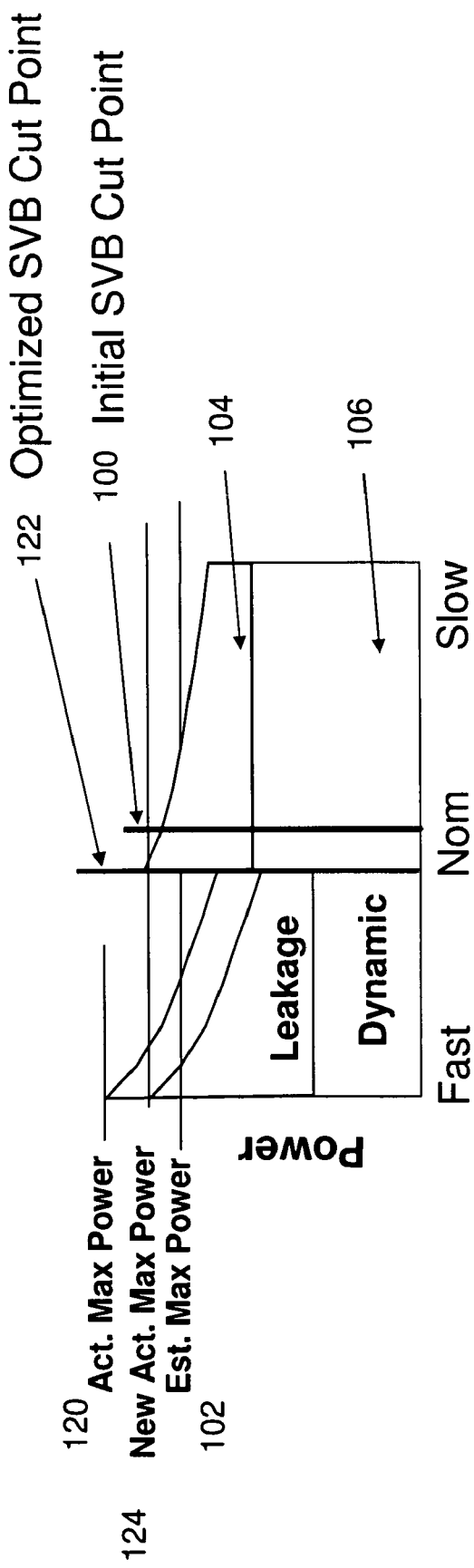

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, chips that are fabricated at the "slow" end of such a process distribution may not meet the desired performance specification, whereas chips fabricated at the "fast" end of this process distribution may exhibit excessive power and leakage current. Therefore, voltage binning may be applied to the slow and fast chips to compensate for differences.

Post-manufacturing voltage binning is a technique that is used to sort manufactured chips into bins based on whether they were fabricated at either the "slow" end or the "fast" end of a process distribution, and to vary the voltage requirements for the chips depending upon the bins they are assigned to in order to reduce maximum chip power. For example, FIG. 1A is a diagram illustrating the dynamic power 106 and leakage current 104 for chips that are manufactured from a common design, but that are different because of different processing conditions that occur within acceptable manufacturing tolerances.

In the past the worst case process ranges drove the required voltage for ultimately running the chip. However, with selective voltage binning, every chip is tested to measure operating speed and the chips are sorted accordingly. For example, in a process-voltage-temperature space, the temperature and voltage of the chip may be fixed and the switching frequency may be measured. If the switching frequency is above a specific cut point, then the chip is on the fast end of the process-voltage-temperature space and placed in a fast chip bin. If the switching frequency is below the cut point, then the chip is on the slow end of the process-voltage-temperature space and placed in a slow chip bin. After the chips are sorted into bins according to the cut point, an optimal supply voltage (Vdd) for operating the chips in each bin is determined. Since both dynamic power consumption and static power consumption are exponentially proportional to the Vdd, a reduction in the required Vdd will reduce both dynamic and leakage power consumption and, thus, overall power consumption.

In FIG. 1A, item 100 represents the selective voltage binning (SVB) cut point between what is considered to be a fast device and what is considered to be a slow device. The fast devices will sorted into the "fast" bin and will be utilized at lower voltages than the slow devices that are sorted into the "slow" bin. Because the fast devices have more leakage 104, the fast devices will consume more power. However, as shown by the estimated maximum power line 102 in FIG. 1A, the fastest of the fast devices will consume the same amount of power as the fastest of the slow devices, because the fast devices will be operated at a lower voltage.

FIG. 1B illustrates that, after the devices are actually manufactured and tested, the actual maximum power 120 may be different than the estimated maximum power 102. Therefore, as shown in FIG. 1C, embodiments herein move the cut point to an optimized cut point 122, after the devices are actually manufactured and tested. This results in a new and lower Actual Max Power 124.

Figure 2:
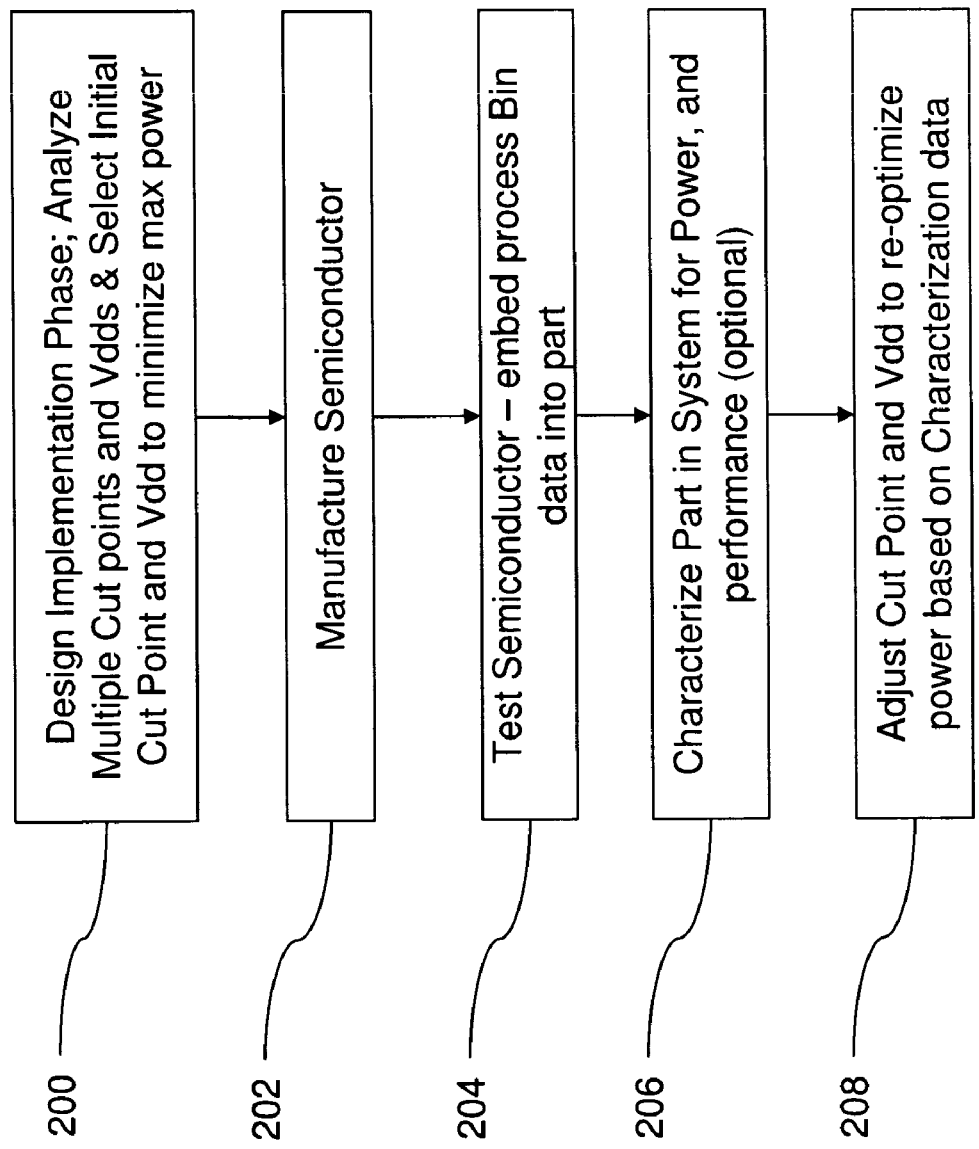
FIG. 2 is a flow diagram illustrating a method embodiment of the invention.

Thus, as shown in flowchart form in FIG. 2, embodiments herein provide a method of optimizing power usage in an integrated circuit design. In item 200, at the design implementation phase, multiple cut points and voltages are analyzed and at least one initial cut point 100 is selected to minimize maximum power 102. More specifically, this process first analyzes multiple operating speed cut points that are expected to be produced by the integrated circuit design. When the integrated circuit design is used to produce many integrated circuit devices (e.g., parts, chips, etc.) these integrated circuit devices will be "identically designed" integrated circuit devices because they were all manufactured according to the same integrated circuit design. However, even these identically designed integrated circuit devices will perform at different operating speeds because of manufacturing process variations.

As mentioned above, the relatively fast integrated circuit devices consume more power than the relatively slow integrated circuit devices. The relatively fast integrated circuit devices will be operated at a lower voltage to keep their operating speed and power consumption approximately equal to the relatively slow integrated circuit device. Therefore, the method selects the initial operating speed cut point 100 that will minimize the maximum power level of the relatively slow integrated circuits and relatively fast integrated circuit devices. The initial operating speed cut point 100 is selected to cause the fastest of the relatively slow integrated circuits to consume the same amount of power 102 as the fastest of the relatively fast integrated circuit devices (which is operating at a relatively lower voltage).

In item 202, the devices are manufactured and in item 204, the devices are tested and binned. In item 204, the operating speed cut points are used to divide these identically designed integrated circuit devices into different bins after manufacture. This "binning" process will produce a bin of relatively slow integrated circuits and a bin of relatively fast integrated circuit devices, with the operating speed cut point determining into which bin the manufactured integrated circuit devices will be sorted. This binning can be done physically, or electronically via programming fuses and/or programming memory within each part.

Thus, after the initial operating speed cut point is established (based on the design and the presumptions about what manufacturing variations will occur), the integrated circuit devices are actually manufactured (202), all by using the same integrated circuit design. The operating speeds and power consumption levels of the integrated circuit devices are then tested (204). The test results can be embedded into some form of memory of the integrated circuit devices.

However, rather than just sorting the integrated circuit devices using the initial operating speed cut point, the method adjusts the initial cut point 100 to a final cut point 122 based on the data from the testing to again minimize the maximum power level of the relatively slow integrated circuits and relatively fast integrated circuit devices. The final operating speed cut point 122 is similarly selected to cause the relatively slow integrated circuits and relatively fast integrated circuit devices to consume the same maximum power. However, the final operating speed cut point 122 is based on actual test results instead of theoretical presumptions and has a higher level of accuracy. Thus, as shown in item 206, the method characterizes the manufactured parts for power, and optionally performance. This allows the method (in item 208) to adjust the cut point and voltage to re-optimize power based on such characterization data. Changing the cutpoint would require a change to the application voltage of parts in the fast bin if power is being optimized. If optimizing for performance, a change in application voltage of parts in both bins may be required.

The present embodiments reduce maximum chip power at the fast process corner where leakage adds most to active power consumption. The method operates slow chips at normal voltage for performance; however, the method operates fast chips at reduced voltage for reduced maximum power. The initial cut point between what is considered a fast chip and a slow chip is selected such that the chips in both the fast and slow bins have the same maximum power. However, this selection is not based on the theoretical analysis (cut point 100) that includes many assumptions that can contribute to error. In power modeling, many areas of uncertainty (active power and leakage power) exist. Similarly, in system thermal modeling, there also is uncertainty. The method determines the final optimal cut point 122 after the parts are characterized in the system. The method may use additional timing runs and/or timing data stored in part; however, the method provides a lower maximum power than would have been achieved with the initial cut point. Further, the method can be programmed after parts are delivered. Thus, while conventional methods require the cut point to be programmed before the testing begins; with the embodiments herein the cut points are configurable and optimizable after testing.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of embodiments, those skilled in the art will recognize that the embodiments of the invention can be practiced with modification within the spirit and scope of the appended claims.

What is claimed is:

1. A method of optimizing power usage in an integrated circuit design, said method comprising:

analyzing multiple operating speed cut points that are expected to be produced by said integrated circuit design, wherein said integrated circuit design produces integrated circuit devices that are identically designed and perform at different operating speeds caused by manufacturing process variations, wherein said operating speed cut points are used to divide said integrated circuit devices after manufacture into relatively slow integrated circuit devices and relatively fast integrated circuit devices, and wherein said relatively fast integrated circuit devices consume more power than said relatively slow integrated circuit devices;

selecting at least one initial operating speed cut point to minimize a maximum power consumption level of said relatively slow integrated circuit devices and said relatively fast integrated circuit devices;

manufacturing said integrated circuit devices using said integrated circuit design using manufacturing equipment;

testing operating speeds of said integrated circuit devices using a tester; and adjusting said initial operating speed cut point to a final operating speed cut point based on said testing to minimize said maximum power consumption level of said relatively slow integrated circuit devices and said relatively fast integrated circuit devices.

2. The method according to claim 1, wherein said initial operating speed cut point and said final operating speed cut point are selected to cause said relatively slow integrated circuit devices and relatively fast integrated circuit devices to consume a same maximum power.

3. The method according to claim 1, further comprising embedding test results in said integrated circuit devices.

4. A method of optimizing power usage in an integrated circuit design, said method comprising:

analyzing multiple operating speed cut points that are expected to be produced by said integrated circuit design, wherein said integrated circuit design produces integrated circuit devices that are identically designed and perform at different operating speeds caused by manufacturing process variations, wherein said operating speed cut points are used to divide said integrated circuit devices after manufacture into relatively slow integrated circuit devices and relatively fast integrated circuit devices, and wherein said relatively fast integrated circuit devices consume more power than said relatively slow integrated circuit devices;

selecting at least one initial operating speed cut point to minimize a maximum power consumption level of said relatively slow integrated circuit devices and said relatively fast integrated circuit devices;

manufacturing said integrated circuit devices using said integrated circuit design using manufacturing equipment;

testing operating speeds and power consumption levels of said integrated circuit devices using a tester; and adjusting said initial operating speed cut point to a final operating speed cut point based on said testing to minimize said maximum power consumption level of said relatively slow integrated circuit devices and said relatively fast integrated circuit devices.

5. The method according to claim 4, wherein said initial operating speed cut point and said final operating speed cut point are selected to cause said relatively slow integrated circuit devices and relatively fast integrated circuit devices to consume a same maximum power.

6. The method according to claim 4, further comprising embedding test results in said integrated circuit devices.

* * * * *